United States Patent
Cervantez et al.

(10) Patent No.: US 11,192,407 B2
(45) Date of Patent: Dec. 7, 2021

(54) PILOT OPERATED REGULATOR WITH ADJUSTABLE MINIMUM DELIVERY PRESSURE

(71) Applicant: Hendrickson USA, L.L.C., Schaumburg, IL (US)

(72) Inventors: Jesse W. Cervantez, Navarre, OH (US); Matt J. Wilson, Canal Fulton, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 99 days.

(21) Appl. No.: 16/579,931

(22) Filed: Sep. 24, 2019

(65) Prior Publication Data

US 2020/0096128 A1 Mar. 26, 2020

Related U.S. Application Data

(60) Provisional application No. 62/736,088, filed on Sep. 25, 2018.

(51) Int. Cl.
| | | |
|---|---|---|
| *B60C 23/00* | (2006.01) | |
| *F16K 17/04* | (2006.01) | |
| *F16K 17/06* | (2006.01) | |
| *F16K 17/12* | (2006.01) | |

(52) U.S. Cl.
CPC .. *B60C 23/00372* (2020.05); *B60C 23/00336* (2020.05); *B60C 23/00354* (2020.05); *F16K 17/04* (2013.01); *F16K 17/0473* (2013.01); *F16K 17/06* (2013.01); *F16K 17/12* (2013.01); *Y10T 137/7774* (2015.04)

(58) Field of Classification Search
CPC .......... Y10T 137/7774; F16K 17/0473; F16K 17/04; F16K 17/06; F16K 17/12; G05D 16/185; B60G 17/0523; B60G 2400/52; B60G 2800/984; B60C 23/002; B60C 2200/06; B60C 23/003
See application file for complete search history.

(56) References Cited

U.S. PATENT DOCUMENTS

| | | | |
|---|---|---|---|
| 3,561,468 A | 2/1971 | Sugden | |
| 3,664,362 A * | 5/1972 | Weise | .................. F16K 17/105 137/102 |
| 4,143,850 A | 3/1979 | Brakebill | |
| (Continued) | | | |

FOREIGN PATENT DOCUMENTS

EP 0378891 B1 6/1993

*Primary Examiner* — Michael R Reid
*Assistant Examiner* — Frederick D Soski
(74) *Attorney, Agent, or Firm* — Dureska & Moore, LLC; David P. Dureska; Benjamin J. Chojnacki

(57) ABSTRACT

A regulator for establishing outlet fluid pressure. The regulator includes a valve body having a fluid pressure inlet in selective fluid communication with a fluid pressure outlet. A pilot pressure inlet is formed in the valve body and in fluid communication with a source of pilot pressure. Valving structure in the valve body establishes outlet fluid pressure as a function of pilot pressure. First adjustable structure within the valve body may establish a minimum outlet fluid pressure threshold without regard to pilot pressure. Second adjustable structure within the valve body may establish outlet fluid pressure offset relative to pilot pressure.

19 Claims, 10 Drawing Sheets

(56) References Cited

U.S. PATENT DOCUMENTS

| | | | |
|---|---|---|---|
| 4,217,927 A * | 8/1980 | Morita | F16K 17/196 137/454.5 |
| 4,219,042 A | 8/1980 | St. Laurent, Jr. | |
| 4,418,737 A * | 12/1983 | Goodell | B60C 23/00 137/224 |
| 4,421,151 A * | 12/1983 | Stumpe | B60C 23/003 137/224 |
| 4,431,043 A * | 2/1984 | Goodell | B60C 23/003 152/417 |
| 4,480,663 A * | 11/1984 | Bergemann | B60T 15/18 137/627.5 |
| 4,498,515 A | 2/1985 | Holtzhauser et al. | |
| 4,553,773 A | 11/1985 | Pierce | |
| 4,616,881 A * | 10/1986 | Muller | B60T 8/00 303/118.1 |
| 4,641,698 A * | 2/1987 | Bitonti | B60C 23/003 152/416 |
| 4,699,355 A | 10/1987 | Tomlin et al. | |
| 4,702,843 A * | 10/1987 | Oswald | B60C 23/003 180/24.07 |
| 4,705,090 A * | 11/1987 | Bartos | B60C 23/003 137/224 |
| 4,765,385 A | 8/1988 | McGeachy | |
| 4,895,199 A * | 1/1990 | Magnuson | B60C 23/003 137/102 |
| 4,924,926 A * | 5/1990 | Schultz | B60C 23/003 152/417 |
| 4,993,729 A * | 2/1991 | Payne | B60G 17/0523 180/24.02 |
| 5,083,811 A | 1/1992 | Sato et al. | |
| 5,253,687 A * | 10/1993 | Beverly | B60C 23/003 152/416 |
| 5,273,064 A * | 12/1993 | Beverly | B60C 23/003 137/102 |
| 5,295,429 A | 3/1994 | Monk | |
| 5,333,645 A | 8/1994 | Galazin | |
| 5,452,919 A * | 9/1995 | Hoyle | B60G 17/0155 280/5.505 |
| 5,466,007 A * | 11/1995 | Smith | B60G 17/0155 280/124.102 |
| 5,544,688 A * | 8/1996 | Freigang | B60C 23/003 152/415 |
| 5,555,910 A * | 9/1996 | Powell | F16K 17/10 137/488 |
| 5,587,698 A * | 12/1996 | Genna | B60C 23/003 340/442 |
| 5,611,875 A * | 3/1997 | Bachhuber | B60C 23/003 141/197 |
| 5,682,918 A * | 11/1997 | Stoll | G05D 16/0663 137/85 |
| 5,725,239 A * | 3/1998 | de Molina | B60G 17/0152 188/266.6 |
| 5,891,277 A * | 4/1999 | Bachhuber | B60S 5/046 152/415 |
| 6,089,831 A * | 7/2000 | Bruehmann | B60G 17/0523 417/282 |
| 6,098,682 A * | 8/2000 | Kis | B60C 23/003 152/415 |
| 6,196,555 B1 * | 3/2001 | Gaibler | B60G 17/005 280/6.154 |
| 6,257,597 B1 | 7/2001 | Galazin | |
| 6,269,691 B1 * | 8/2001 | Sowatzke | B60C 23/003 73/146.2 |
| 6,293,147 B1 | 9/2001 | Parker et al. | |
| 6,401,743 B1 | 6/2002 | Naedler | |
| 6,418,956 B1 * | 7/2002 | Bloom | G05D 16/185 137/14 |
| 6,820,641 B2 | 11/2004 | Larsen | |
| 6,868,719 B1 * | 3/2005 | Claussen | B60C 23/04 73/146.2 |
| 7,331,592 B2 * | 2/2008 | Heer | B60T 17/02 280/124.157 |
| 7,431,406 B2 * | 10/2008 | Aumuller | B60T 7/10 303/15 |
| 7,552,932 B2 * | 6/2009 | Matern | B60G 17/0155 280/124.16 |
| 8,220,876 B2 * | 7/2012 | Detlefs | B60T 17/02 303/3 |
| 8,262,058 B2 | 9/2012 | Kot | |
| 8,297,297 B2 * | 10/2012 | Schnittger | B60T 17/02 137/115.04 |
| 8,348,634 B2 * | 1/2013 | Ertl | B60T 17/002 417/304 |
| 8,467,950 B1 * | 6/2013 | Pfefferl | B60T 17/02 701/100 |
| 8,490,641 B2 * | 7/2013 | Schnittger | B60T 17/04 137/115.25 |
| 8,512,007 B2 * | 8/2013 | Hebrard | F04D 27/0292 417/223 |
| 8,745,982 B2 * | 6/2014 | Bordacs | B01D 53/0454 60/409 |
| 8,973,633 B2 | 3/2015 | Wilson et al. | |
| 9,050,957 B2 * | 6/2015 | Minato | B01D 53/0454 |
| 9,283,942 B2 * | 3/2016 | Minato | B60T 13/662 |
| 9,352,621 B2 * | 5/2016 | Morgan | B60C 23/003 |
| 9,360,120 B2 * | 6/2016 | Matthews | F16K 47/04 |
| 9,371,063 B2 * | 6/2016 | Schnittger | B60T 13/662 |
| 9,387,731 B2 | 7/2016 | Kranz | |
| 9,650,029 B2 * | 5/2017 | Hilberer | B60T 17/02 |
| 9,783,019 B2 * | 10/2017 | Diekmeyer | F15B 11/162 |
| 10,137,750 B2 * | 11/2018 | Macnamara | B60G 17/0155 |
| 10,221,998 B2 * | 3/2019 | Masuda | B60T 17/02 |
| 10,960,724 B2 * | 3/2021 | Meier | B60G 17/0523 |
| 2002/0153688 A1 * | 10/2002 | Jurr | B60G 17/0523 280/124.16 |
| 2003/0051554 A1 * | 3/2003 | Stiller | B60G 17/0523 73/760 |
| 2003/0137378 A1 | 7/2003 | Parker et al. | |
| 2003/0192372 A1 * | 10/2003 | Claussen | B60C 23/003 73/146 |
| 2005/0145278 A1 * | 7/2005 | Igawa | G05D 16/185 137/486 |
| 2005/0173881 A1 * | 8/2005 | Harrison | B60T 17/02 280/124.16 |
| 2005/0248069 A1 * | 11/2005 | Bolt | B60G 17/0155 267/64.16 |
| 2005/0268968 A1 * | 12/2005 | Hourtouat | G05D 16/163 137/492 |
| 2005/0269753 A1 * | 12/2005 | Geiger | B60G 17/0523 267/64.28 |
| 2005/0279409 A1 * | 12/2005 | Thoms | F15B 13/024 137/493.6 |
| 2006/0006733 A1 * | 1/2006 | Geiger | B60G 17/0157 303/3 |
| 2006/0043691 A1 * | 3/2006 | Geiger | B60G 17/0155 280/124.16 |
| 2006/0049606 A1 * | 3/2006 | Geiger | B60G 17/0523 280/124.157 |
| 2006/0180256 A1 * | 8/2006 | Mittal | B60C 23/003 152/416 |
| 2006/0267297 A1 * | 11/2006 | Nordmeyer | B60G 11/27 280/5.515 |
| 2007/0080514 A1 * | 4/2007 | Stender | B60G 17/0155 280/124.157 |
| 2007/0170679 A1 * | 7/2007 | Stender | B60G 17/0523 280/124.16 |
| 2007/0277886 A1 * | 12/2007 | Morris | B60G 17/0523 137/596.15 |
| 2009/0032158 A1 | 2/2009 | Rudolf et al. | |
| 2009/0033055 A1 * | 2/2009 | Morris | B60G 17/0155 280/124.16 |
| 2010/0071784 A1 | 3/2010 | Gentry | |
| 2010/0147400 A1 | 6/2010 | Hawkins et al. | |
| 2010/0155631 A1 | 6/2010 | Bernardi | |
| 2013/0000756 A1 * | 1/2013 | Griffin, Jr | F16K 31/1266 137/528 |
| 2013/0255609 A1 * | 10/2013 | Frank | F01L 1/34 123/90.14 |

(56) References Cited

U.S. PATENT DOCUMENTS

| | | | |
|---|---|---|---|
| 2013/0255787 A1* | 10/2013 | Frank | B60G 11/27 137/1 |
| 2013/0318954 A1* | 12/2013 | Frank | B60G 17/0155 60/407 |
| 2014/0261939 A1* | 9/2014 | Therber | B60C 23/003 152/415 |
| 2014/0319788 A1* | 10/2014 | Gomann | B60G 17/0523 280/5.508 |
| 2014/0333038 A1* | 11/2014 | Gocz | B60G 17/0523 280/6.157 |
| 2015/0029015 A1* | 1/2015 | Pierce | B60C 23/003 340/442 |
| 2015/0144222 A1* | 5/2015 | Wilson | B60C 23/003 141/66 |
| 2015/0174972 A1* | 6/2015 | Zhou | B60C 23/0467 340/447 |
| 2015/0202931 A1* | 7/2015 | Honig | B60C 23/001 152/416 |
| 2015/0258871 A1* | 9/2015 | Remboski | B60G 5/00 280/124.16 |
| 2016/0326721 A1* | 11/2016 | Lim | F15B 13/026 |
| 2016/0363229 A1* | 12/2016 | Thompson | F16K 17/048 |
| 2017/0036505 A1* | 2/2017 | Bohn | F04B 35/04 |
| 2017/0120695 A1* | 5/2017 | Staedele | B60C 23/0484 |
| 2017/0259641 A1* | 9/2017 | Ohashi | B60G 17/0155 |
| 2017/0274723 A1* | 9/2017 | Tanaka | B60G 17/0155 |
| 2017/0349009 A1* | 12/2017 | Ehrlich | B60C 23/0486 |
| 2017/0361674 A1* | 12/2017 | Ahmadian | B60G 21/005 |
| 2018/0017178 A1* | 1/2018 | Al-Qahtani | F16K 17/10 |
| 2018/0186198 A1* | 7/2018 | Zhou | B60C 23/003 |
| 2018/0222275 A1* | 8/2018 | Reuter | B60G 17/019 |
| 2018/0244281 A1* | 8/2018 | Jankowski | B60W 10/20 |
| 2018/0287531 A1* | 10/2018 | Abdelfattah | B60G 17/0408 |
| 2018/0312018 A1 | 11/2018 | Wilson et al. | |
| 2018/0319236 A1* | 11/2018 | Riddiford | B60G 17/0424 |
| 2018/0319239 A1* | 11/2018 | Repela | B60G 17/056 |
| 2019/0176562 A1* | 6/2019 | Ohashi | B60G 17/0523 |
| 2020/0079170 A1* | 3/2020 | Asharam | B60T 17/004 |

* cited by examiner

PILOT OPERATED REGULATOR WITH ADJUSTABLE MINIMUM DELIVERY PRESSURE

CROSS-REFERENCE TO RELATED APPLICATIONS

This application claims the benefit of U.S. Provisional Patent Application Ser. No. 62/736,088 filed Sep. 25, 2018.

TECHNICAL FIELD

The disclosed subject matter relates generally to fluid pressure regulators responsive to pilot pressure input. The disclosed subject matter relates particularly to tire inflation systems for heavy-duty vehicles incorporating a fluid pressure regulator capable of adjusting fluid pressure in vehicle tires in response to a pilot pressure signal and having an adjustable minimum outlet pressure.

BACKGROUND

Tire inflation systems for heavy-duty vehicles, such as trucks, tractor-trailers, semi-trailers, trailers and the like, are known. Each such heavy-duty vehicle typically includes multiple tires requiring inflation with air to specific target pressures for optimal performance. The relatively large number of tires on any given heavy-duty vehicle makes it difficult to manually check and maintain the optimal tire pressure in each and every tire. This difficulty is compounded by the fact that numerous heavy-duty vehicles in a fleet may be located at a site for an extended period of time, during which tire pressures might not be checked. Any one of these heavy-duty vehicles might be quickly placed into service, leading to the possibility of operation with unchecked and under-inflated tires.

Operation of a heavy-duty vehicle with under-inflated tires may increase the chance for failure of a tire as compared to a tire within a target pressure inflation range. Improperly inflated tires may adversely affect tire performance and service life. If a check of air pressure in tires reveals improper inflation, it is desirable and recommended to restore pressure to an optimum or target pressure.

Prior art tire inflation systems approximate and maintain a target pressure in heavy-duty vehicle tires. Prior art tire inflation systems generally inflate the tire by providing air from a vehicle air supply to the tire by using a variety of different components, arrangements, valves, conduit, and/or methods.

Some prior art tire inflation systems may vary air pressure in tires of the heavy-duty vehicles as a function of the load/weight of the heavy-duty vehicle. These prior art tire inflation systems may rely on electronic controls, including electronic processors, to execute relatively complex algorithms to perform calculations that estimate the load/weight of the heavy-duty vehicle. The electronic controls generally require the use of the heavy-duty vehicle electrical system and add cost and complexity to prior art tire inflation systems.

Other prior art tire inflation systems vary air pressure in tires of the heavy-duty vehicle by using air pressure in suspension air springs of the heavy-duty vehicle as an indication of the load/weight of the heavy-duty vehicle. The tire inflation systems may include pilot operated regulators. Pilot operated regulators are designed to vary output pressure delivered to the tires based on a control or pilot pressure. The majority of pilot operated regulators have a one-to-one relationship between the pilot pressure and the output pressure. That is, the output pressure of the pilot operated regulator is the same as the control pilot pressure. There are some pilot operated regulators that may have a ratio of output pressure to pilot pressure other than a one-to-one relationship.

While satisfactory for their intended uses, prior art tire inflation systems have limitations, disadvantages and drawbacks. Electronic controls, numerous components, arrangements, valves, and conduit of known systems are undesirably expensive, complex, difficult to install and configure, and potentially unreliable. Establishing air pressure in tires of the heavy-duty vehicle by pneumatic control may use complex conduits and multiple control valves.

It is desirable to provide an improved tire inflation system that has automatic and continuous adjustment of target inflation pressure based upon the heavy-duty vehicle load, without the use of electronic components. The improved tire inflation system for heavy-duty vehicles of the disclosed subject matter satisfies these needs and overcomes the limitations, disadvantages and drawbacks of the prior art tire inflation systems. Specifically, the load-based tire inflation system of the disclosed subject matter continuously monitors fluid pressure in vehicle tires and adjusts inflation pressure with a regulator in response to pilot pressure, often as a function of pneumatic suspension system pressure. The load-based tire inflation system of the disclosed subject matter has an adjustable minimum outlet pressure feature and an adjustable offset pressure feature.

The pilot operated regulator of the disclosed subject matter may also have non-tire inflation system applications, such as for example industrial or factory automation applications. Such non-tire inflation system applications may require that operating pressure not be allowed to drop below a minimum threshold value. A pressure offset feature may also be a useful feature when an application requires different operating pressure than the pilot pressure. Both minimum threshold value and pressure offset features are contained in a single common valve body and apply controlling forces to the same single pilot operated regulator valve structure of the disclosed subject matter. The pilot operated regulator of the disclosed subject matter has all these desirable features.

SUMMARY

A summary is provided to introduce concepts of the disclosed subject matter. The summary is not intended to identify key factors or essential features of the disclosed subject matter. The summary also is not intended to limit the scope of the disclosed subject matter.

The disclosed subject matter is an improved pilot operated regulator for automatically and continuously establishing outlet fluid pressure. The pilot operated regulator of the disclosed subject matter includes a valve body with a fluid pressure inlet in selective regulated fluid communication with a fluid pressure outlet by novel valving structure. The valve body also has a pilot pressure inlet in fluid communication with a source of pilot pressure. The valving structure establishes outlet fluid pressure as a function of pilot pressure. Adjustable structure associated with the valve body advantageously establishes a minimum outlet fluid pressure threshold regardless of pilot pressure.

The regulator also includes another adjustable structure to establish outlet fluid pressure that is offset relative to pilot pressure. The adjustable structures may be coaxially arranged within the valve body. The adjustable offset structure may also be coaxially arranged with a direction of movement of the valving structure for adjustably setting the outlet pressure higher or lower relative to the pilot pressure. The adjustable offset structure includes a piston and a pilot diaphragm separated by resilient structure to define a pilot chamber in fluid communication with the source of pilot pressure. The force applied by the resilient structure establishes outlet fluid pressure offset relative to pilot pressure.

A resilient mechanism acts on the piston to position the pilot diaphragm for establishing the minimum outlet fluid pressure threshold without regard to pilot pressure. A regulator diaphragm spaced from and interconnected with the pilot diaphragm positions the regulator diaphragm to affect the state or condition of the regulator valving structure. The adjustable structure for setting the minimum threshold pressure may be coaxially arranged with a direction of movement of the regulator valving structure.

The pilot operated regulator of the disclosed subject matter is particularly suitable for use in a load-based tire inflation system for a heavy-duty vehicle. The heavy-duty vehicle has an air spring suspension system in which fluid pressure in the air spring suspension system varies with the weight of the heavy-duty vehicle. The source of fluid pressure is fluid pressure in the air spring suspension system and, thus, pressure communicated to the tire inflation system is a function of load of heavy-duty vehicles. The improved pilot operated regulator could also be used in industrial machinery, factory equipment or automation applications where it is desirable to maintain operating pressure at or above a minimum threshold value. The single improved pilot operated regulator can replace several components, such as valves and conduit, in the tire inflation system and possibly in the other applications. The pilot operated regulator of disclosed subject matter is mechanical only without electrical components.

DRAWINGS

The following description and drawings set forth certain illustrative aspects and implementations of the disclosed subject matter. The drawings are indicative of a few of the various ways in which one or more aspects or implementations may be employed. Further features of the disclosed subject matter will become apparent from reading the following description with reference to the accompanying drawings, in which.

Similar numerals refer to similar parts throughout the drawings and description.

DESCRIPTION

For exemplary purposes, details are set forth in order to provide an understanding of the disclosed subject matter. It will be understood, however, that the disclosed subject matter can be practiced and implemented without these specific details.

Figure 1:
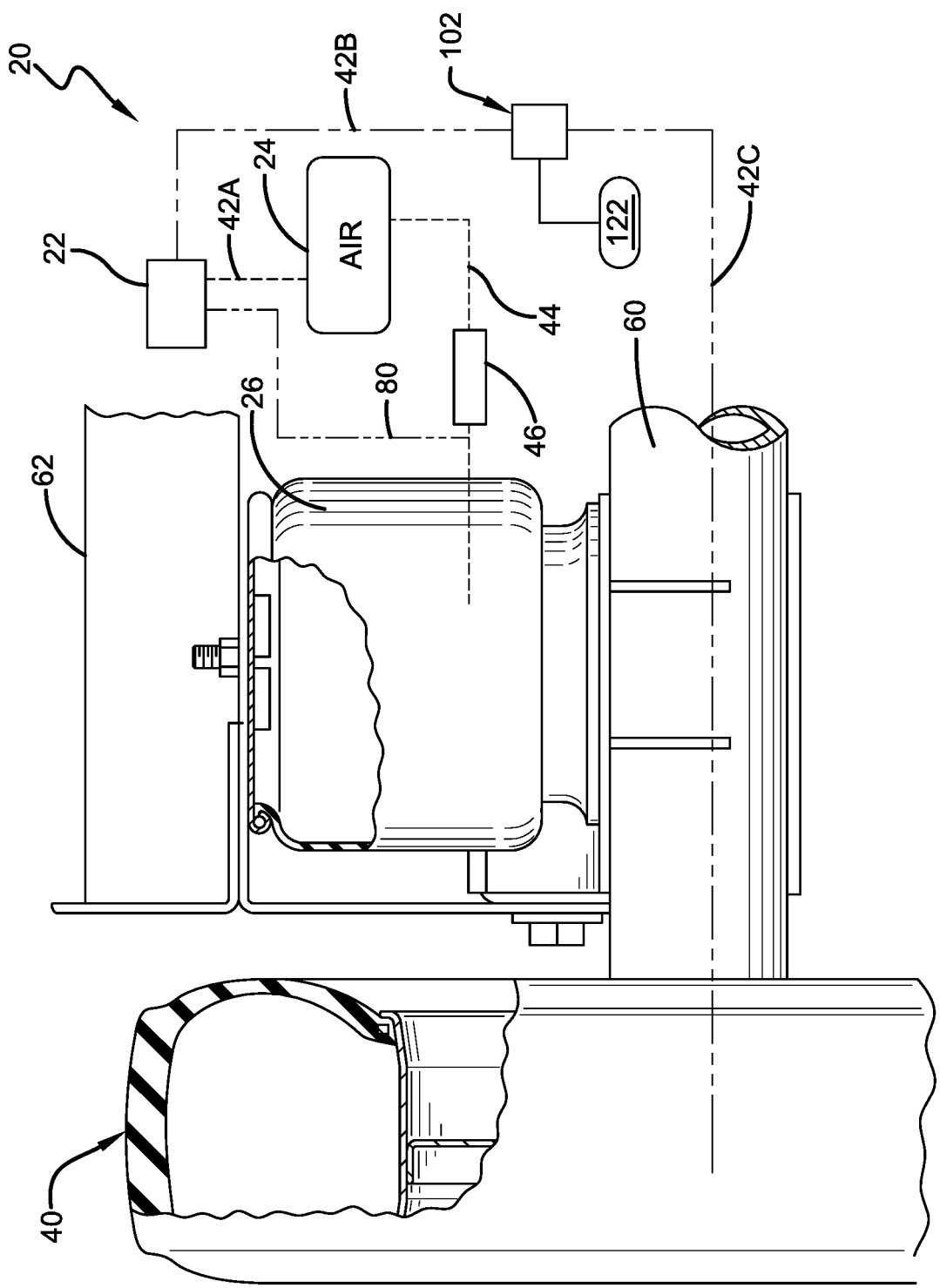
FIG. 1 is a fragmentary diagrammatic elevation view, with portions broken away and in section, of a load-based tire inflation system incorporating a pilot operated regulator according to an aspect of the disclosed subject matter.

A load-based tire inflation system 20 incorporating an improved pilot operated regulator 22, constructed according to an aspect of the disclosed subject matter, is illustrated in FIG. 1. The improved pilot operated regulator 22 may provide an outlet fluid flow at a minimum threshold pressure. The load-based tire inflation system 20 may be used on a heavy-duty vehicle (not shown). The improved pilot operated regulator 22 may also be employed in industrial machinery, factory equipment or automation applications where it is desirable to maintain delivered pressure at or above a minimum threshold pressure. The improved pilot operated regulator 22 may replace several components, such as valves and conduits, previously needed to perform the same function as the single improved pilot operated regulator of the disclosed subject matter.

The improved pilot operated regulator 22 is in fluid communication with a source of fluid pressure 24, such as compressed air. The source of fluid pressure is also in selective fluid communication with an air spring 26 of an air suspension system. The fluid pressure in the air spring 26 is proportional to and directly indicative of the load or weight of the heavy-duty vehicle in which the tire inflation system 20 is used. For the purpose of convenience, reference shall be made to one suspension structure or air spring 26, tire and wheel assembly 40 and axle 60, with the understanding that such reference may include and equally apply to more than one air spring, more than one tire and wheel assembly and more than one axle. It will also be appreciated that use of the term "air spring" may include associated suspension system structure, conduits, sensors and other equipment.

The improved pilot operated regulator 22 of the disclosed subject matter establishes outlet fluid pressure PO (FIGS. 2-3) as a function of pilot pressure PP. The improved pilot operated regulator 22 includes adjustable structure to establish an outlet fluid pressure PO at a minimum pressure threshold regardless of pilot pressure PP. The improved pilot operated regulator 22 also includes adjustable structure to establish outlet fluid pressure PO that is offset relative to pilot pressure PP.

The load-based tire inflation system 20 is designed to continually monitor the load of the heavy-duty vehicle and automatically and continually adjust fluid pressure in the tire and wheel assembly 40 of the heavy-duty vehicle as a function of the load or total weight of the heavy-duty vehicle characterized by fluid pressure in the air spring 26. This continuous and automatic pressure adjustment of air in the tire and wheel assembly 40 optimizes the pressure for a given load condition of the heavy-duty vehicle. This type of continuous adjustment may improve fuel economy and performance of the heavy-duty vehicle, service life of the tires, and reduce equipment downtime and maintenance. As a result, the operating cost of the heavy-duty vehicle can be desirably reduced.

The tire and wheel assembly 40 is operatively mounted to a wheel end assembly (not shown) of the axle 60 of the heavy-duty vehicle and is rotatable relative to the axle, as is known. The tire and wheel assembly 40 includes a tire mounted on a rim or wheel, as is known. The tire and wheel assembly 40 is in selective fluid communication with the source of fluid pressure 24 over supply line or pneumatic conduit 42 that may extend through the axle 60. In some instances, the axle 60 itself may serve as at least part of the pneumatic conduit 42. The source of fluid pressure 24 may be the same or a different source of fluid pressure in communication with the air spring 26.

The pilot operated regulator 22 selectively controls the flow of fluid pressure to the tire and wheel assembly 40. While only one air spring 26 and one tire and wheel assembly 40 of a wide base single tire system on one side of the transversely extending axle 60 is illustrated in FIG. 1, the disclosed subject matter applies equally to a dual tire system on either side of the axle and to heavy-duty vehicles with multiple axles. If dual tire and wheel assemblies 40 are employed on an end of the axle 60, both tires may be in fluid communication with one another by a line or hose extending between the tire and wheel assemblies or separately with the source of fluid pressure 24.

For the purpose of convenience, only a single tire and wheel assembly 40 is illustrated in FIG. 1, but it is to be understood that the load-based tire inflation system 20 is typically utilized with single or dual tires mounted to opposite ends of an axle 60. The heavy-duty vehicle may have more than one axle 60 connected to the load-based tire inflation system 20.

If the heavy-duty vehicle is not carrying any cargo or is essentially empty, the air spring 26 may have a relatively low fluid pressure at or near a minimum operating pressure. The pressure of the tire and wheel assembly 40 would be near a minimum threshold pressure. The pilot operated regulator 22 preferably maintains the pressure in the tire and wheel assembly 40 at or near the minimum threshold pressure until the load in the heavy-duty vehicle changes. When the heavy-duty vehicle is loaded, the air spring 26 typically has a different and relatively higher pressure above the minimum operating pressure. The pilot operated regulator 22 proportionately, automatically, and continuously changes the pressure in the tire and wheel assembly 40 in response to a change in the pressure of the air spring 26. The pressure of the tire and wheel assembly 40 would be near an optimal pressure for the loaded heavy-duty vehicle.

The load-based tire inflation system 20 utilizing the pilot operated regulator 22 of the disclosed subject matter may have a plurality of suitable configurations. One such variation of the pilot operated regulator 22 is schematically diagrammed in FIG. 2 incorporated into a load-based tire inflation system 20 for a heavy-duty vehicle.

The load-based tire inflation system 20 (FIGS. 1-2) includes a source of fluid pressure 24 such as compressed air or nitrogen, which may be stored in a pressure vessel or reservoir or supplied by a compressor. The source of fluid pressure 24 is capable of selective fluid communication with a tire and wheel assembly 40 through any suitable conduit system, such as pneumatic conduit portions 42A, 42B and 42C. The pneumatic conduit portion 42A fluidly connects the pilot operated regulator 22 with the source of fluid pressure 24. The pneumatic conduit portion 42A may include check valve 43 (FIG. 2) to prevent any flow into the source of fluid pressure 24. The pneumatic conduit portions 42B, 42C communicate a pneumatic signal proportional to the fluid pressure in the tire and wheel assembly 40 to the pressure operated regulator 22. The source of fluid pressure 24 is sufficiently sized in volume and may be maintained at a pressure above the pressure in the air spring 26. The source of fluid pressure 24 may also be sufficiently sized and maintained at a pressure above the pressure in the tire and wheel assembly 40 to supply the tire inflation system 20 sufficient pressure and volume to quickly fill the tire and wheel assembly. The source of fluid pressure 24 is preferably sized to also operate other components and systems of the heavy-duty vehicle, such as, air actuated brakes (not shown) and the air springs 26.

Figure 2:
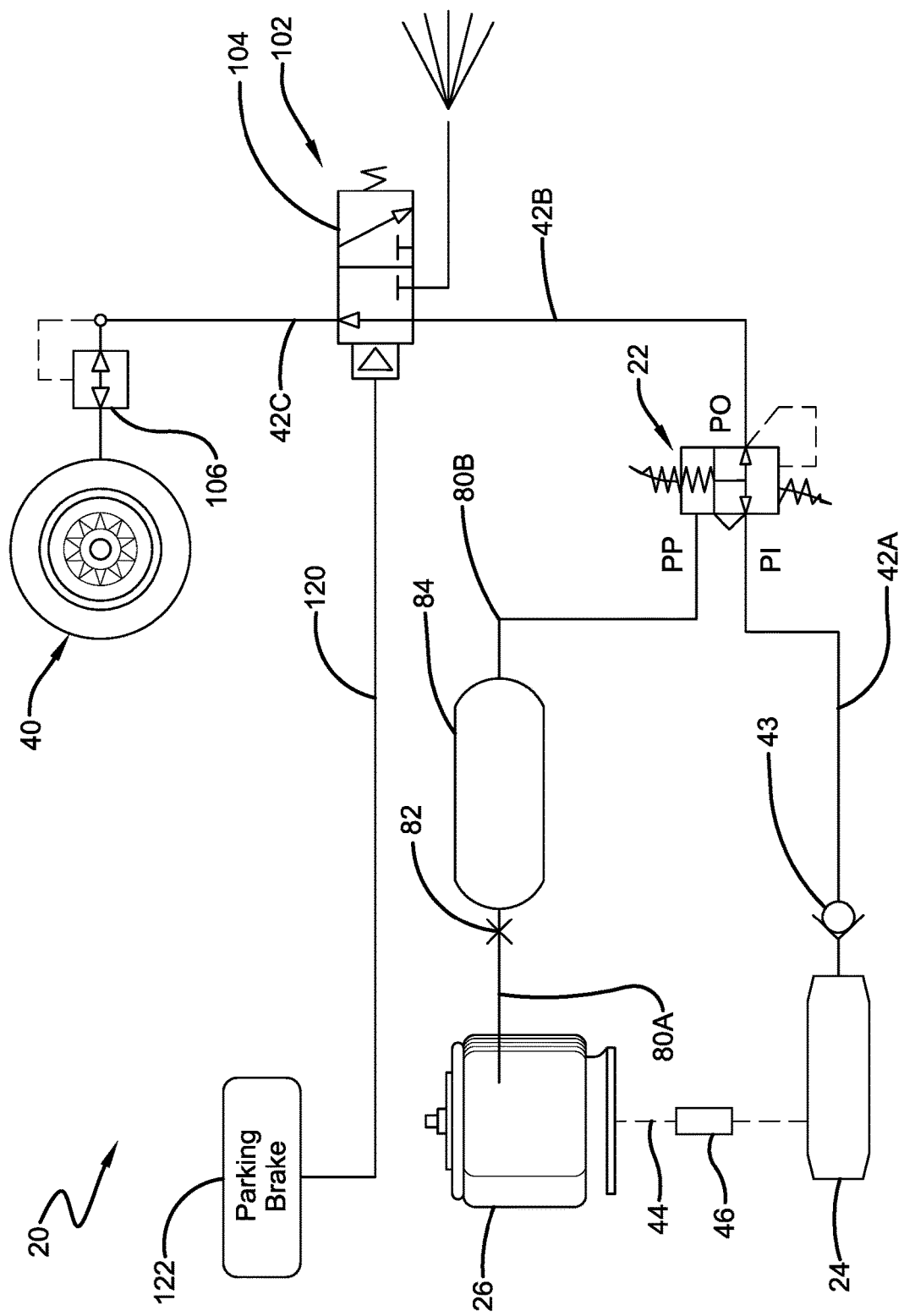
FIG. 2 is a schematic diagram of an exemplary implementation of the pilot operated regulator in the load-based tire inflation system illustrated in FIG. 1.

Each suspension structure or air spring 26 of an air ride suspension is in fluid communication with the source of fluid pressure 24 by a conduit 44. A valve 46 in the conduit 44 may control the fluid flow into and out of the air spring 26. The air spring 26 is located between an axle 60 and a frame member 62 (FIG. 1) of the heavy-duty vehicle. The frame member 62 may be any suitable frame component used for heavy-duty vehicles, such as a primary frame, a sub-frame, or a movable or non-movable slider, without affecting the overall concept of the disclosed subject matter. The air spring 26 suspends and/or positions the axle 60 relative to the frame member 62 as a function of fluid pressure in the air spring. Fluid pressure in the air spring 26 varies with the load or overall weight of the heavy-duty vehicle. While only one air spring 26 is illustrated in FIGS. 1-2 for convenience and simplicity, it will be apparent that more than one air spring may be incorporated into the air ride suspension of the heavy-duty vehicle and that every air spring could be monitored and controlled by the load-based tire inflation system 20.

The air spring 26 may absorb forces that act on the heavy-duty vehicle during use and operation. It is generally desirable for the air spring 26 to be relatively rigid in order to resist roll forces and provide roll stability for the heavy-duty vehicle. It is also desirable for the air spring 26 to be relatively flexible to assist in cushioning the heavy-duty vehicle from impacts and compliance with a road surface. Thus, the fluid pressure in each air spring 26 can vary to provide the desired ride, handling, and other performance characteristics for the heavy-duty vehicle.

A fluid conduit or pilot pressure signal path portions 80A, 80B (FIG. 2 and collectively referred to as 80 in FIG. 1) may be used to directly communicate fluid pressure of the air spring 26 as pilot pressure PP to the pilot operated regulator 22. The fluid pilot pressure PP communicated by pilot pressure signal path 80 is pneumatic and indicates the fluid pressure in the air spring 26.

The load-based tire inflation system 20 may include a choke 82 (FIG. 2) that is fluidly connected to one or more air spring(s) 26 and is located in pilot pressure signal path 80A. The choke 82 provides a fluid connection to the air spring 26, so that the pneumatic pressure in the air spring may be communicated to pilot operated regulator 22 without draining significant air pressure from the air spring. A volumetric structure such as a control volume 84, which may be an auxiliary or supplemental reservoir, pressure vessel, or conduit, may be fluidly connected downstream of air spring 26. The control volume 84 could provide a volume that dissipates pressure spikes and drops, and thus, condition the pilot pressure signal that air spring 26 provides to the pilot operated regulator 22. The pilot pressure signal path portion 80A fluidly connects the air spring 26 with the control volume 84. The pilot pressure signal path portion 80B fluidly connects the control volume 84 to the pilot operated regulator 22.

The pilot operated regulator 22 continuously adjusts fluid pressure in the tire and wheel assembly 40 as a function of fluid pressure in the air spring 26 represented by pilot pressure PP. Continually monitored fluid pressure in the air spring 26 is directly proportional to, and indicative of, the weight of the heavy-duty vehicle, or load carried by the heavy-duty vehicle, such that the pilot operated regulator 22 does not have to calculate or estimate the weight or load. It is contemplated that pilot operated regulator 22 could, alternatively, be used to detect load-based fluid pressure in a suspension structure such as a lift air bag in a lift axle/suspension system or load-based input from a ride-height control valve, or the like, as pilot pressure PP input.

The pilot operated regulator 22 includes internal structure to set and maintain a minimum threshold outlet pressure. This minimum threshold outlet pressure is adjustable to a desired pressure level that maintains the minimum threshold pressure for tire and wheel assembly 40. This minimum threshold pressure may generally be in the range of from about 62 psi to about 85 psi. The pilot operated regulator 22, thus, enables the load-based tire inflation system 20 to provide a desired minimum operating pressure for the tire and wheel assembly 40 to be maintained.

Monitoring the load of the heavy-duty vehicle may be accomplished by fluid communication with one or more air springs 26, a ride height control valve, or any pneumatic system that is indicative of the total load or weight of the heavy-duty vehicle. For exemplary purposes, the fluid connection to at least one air spring 26 provides the pilot pressure PP signal to the pilot operated regulator 22. The term "load" is intended to mean the total weight of the heavy-duty vehicle during various operational situations or conditions. For example, load means the total weight of the heavy-duty vehicle when empty or carrying no cargo, the total weight of the heavy-duty vehicle when carrying a full load of cargo, or the total weight of the heavy-duty vehicle in any situation or condition between empty and full of cargo. It is desirable to adjust the air pressure in the tire and wheel assembly 40 of the heavy-duty vehicle in response to changes in load of the heavy-duty vehicle in order to optimize the performance and service life of the tires.

The pneumatic conduit section 42B may be fluidly connected to and extends between the pilot operated regulator 22 and a tire isolation system 102, if so provided, that includes a tire isolation pilot valve 104. When the tire isolation system 102 is in an open position, air may flow through the isolation pilot valve 104 and through pneumatic conduit portion 42C to a wheel valve 106 and ultimately to the tire and wheel assembly 40. The tire isolation pilot valve 104 may be biased to a position that obstructs or blocks the fluid flow from the pneumatic conduit 42B to prevent loss of pressure in the tire and wheel assembly 40 when the vehicle is parked. The tire isolation pilot valve 104 exhausts or vents to atmosphere the flow of air coming from the third pneumatic conduit section 42C, when tire isolation pilot valve 104 moves to the closed position.

The load-based tire inflation system 20 includes the wheel valve 106 for each tire and wheel assembly 40. Each wheel valve 106 is capable of isolating a respective tire and wheel assembly 40 from the rest of the load-based tire inflation system 20 in the event of, for example, a leak in another tire or somewhere in the tire inflation system. The wheel valve 106 actuates or opens at a selected pressure setting or pressure level that is below any likely minimum target inflation pressure, thereby enabling air flow to the tire and wheel assembly 40 from pilot operated regulator 22 to inflate the tire and wheel assembly to at least minimum target pressure.

A parking brake conduit 120 may extend between and be fluidly connected to the tire isolation pilot valve 104 and a parking brake 122 of the heavy-duty vehicle. When the parking brake 122 is actuated, a pneumatic signal is communicated to the tire isolation pilot valve 104 through conduit 120. The connection of tire isolation pilot valve 104 to the parking brake 122 enables the tire isolation pilot valve and the wheel valves 106 to isolate the tire and wheel assembly 40 when the vehicle is parked.

The tire isolation system 102 is a feature that is particularly useful in the load-based tire inflation system 20 to minimize pressure loss in tire and wheel assembly 40 when the vehicle is parked, thereby minimizing the need to provide significant re-inflation of the tire for operation. Minimizing the need to provide significant re-inflation of the tire and wheel assembly 40 in turn significantly reduces the time and resources, such as size of the source of fluid pressure 24, required to inflate the tire and wheel assembly when the heavy-duty vehicle is put into service.

The load-based tire inflation system 20 may be a constant-pressure system that does not exhaust air to atmosphere unless the heavy-duty vehicle load has been reduced and the tire inflation system responds by reducing pressure in the tire and wheel assembly 40 and the tire isolation system 102 actuates. It is to be appreciated that such a constant pressure system retains at least some amount of pressure in at least pneumatic conduit portion 42C.

The load-based tire inflation system 20 only employs mechanical and pneumatic components that are mechanically and/or pneumatically actuated. The load-based tire inflation system 20, thus, is relatively reliable, economical, and is easy to install and use. It is also understood that the pilot operated regulator 22 could, alternatively, be used to measure load-based fluid pressure in a suspension structure such as a load-based input from a ride-height control valve, or the like. Thus, the load-based tire inflation system 20 provides a simple integrated and economical modular design which includes the functionality of a one-way check valve 43, pilot operated regulator 22, and tire isolation valve 104.

The single pilot operated regulator 22 may be used to establish a minimum pressure threshold for the tire and wheel assembly 40 regardless of what the pilot pressure PP happens to be. Fluid pressure in the tire and wheel assembly 40 may then be maintained at or above the minimum pressure threshold. The fluid pressure in the tire and wheel assembly 40 is adjustable in the pilot operated regulator 22 to maintain a pressure level that is optimal for reducing tire wear and extending tire service life.

The single pilot operated regulator 22 may also be used to offset the delivered outlet pressure PO that is different than the pilot pressure PP. The different fluid offset outlet pressure PO may be delivered to the tire and wheel assembly 40. This different offset fluid outlet pressure PO may be used to compensate outlet pressure when the particular application requires a different operating pressure than the pilot pressure PP.

A method of using the load-based tire inflation system 20 (FIGS. 1-2) for a heavy-duty vehicle incorporating the pilot operated regulator 22 of the disclosed subject matter includes the step of providing at least one source of fluid pressure 24. The source of fluid pressure 24 supplies a fluid, such as compressed air or nitrogen, to the air spring 26 and the tire and wheel assembly 40. The fluid pressure and fluid flow supplied may be from a single source of fluid pressure 24 or may be supplied by separate and independent sources of fluid pressure, such as a reservoir tank and/or compressor.

Fluid pressure in the air spring 26 varies with and is proportional to the load or weight of the heavy-duty vehicle. Fluid pressure in the air spring 26 is detected and monitored as an indication of weight or load of the heavy-duty vehicle. The air spring 26 may be put in selective fluid communication with the source of fluid pressure 24. The pilot operated regulator 22 is provided in fluid communication with the source of fluid pressure 24. A pilot pressure signal path 80 may be provided that directly communicates the fluid pressure in the air spring 26 as pilot pressure PP to the pilot operated regulator 22. The air spring 26 generates a pneumatic signal indicative of the air pressure in the air spring as pilot pressure PP. The signal or fluid pressure communicated by the pilot pressure signal path 80 to a pilot operated regulator 22 is indicative of the fluid pressure in the air spring 26 and is a function of load of the heavy-duty vehicle. The pilot operated regulator 22 compares the pilot pressure PP received to an outlet pressure PO and adjusts the outlet pressure to be the same as or a function of the pilot pressure. The pilot operated regulator 22 may also be set to maintain an outlet pressure PO at or above a minimum threshold pressure which may be adjusted. The pilot operated regulator 22 may be manually adjusted to vary the outlet pressure PO by an offset amount relative to the pilot pressure PP.

Figure 3:
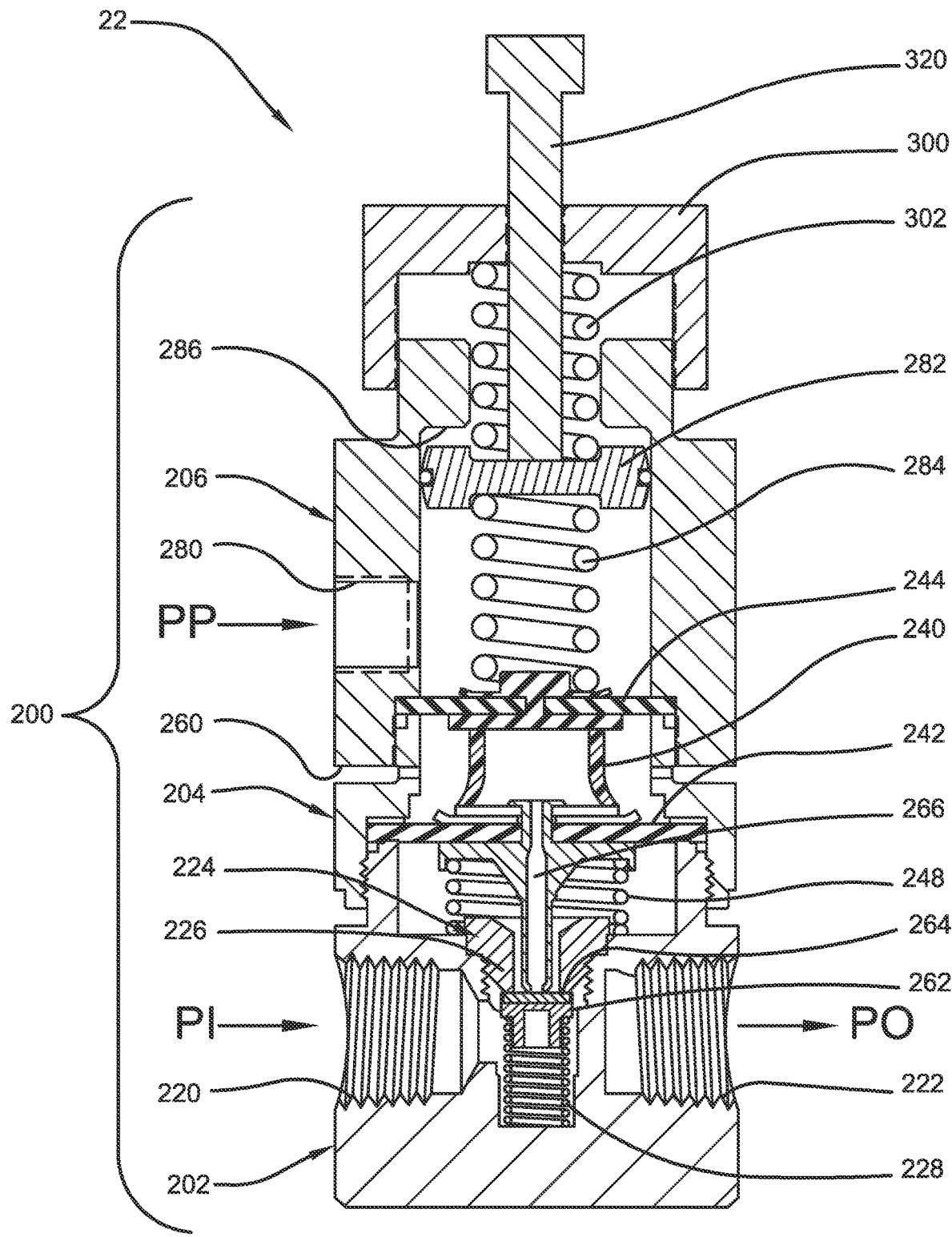
FIG. 3 is an enlarged cross-sectional side elevation view of the pilot operated regulator illustrating functional components.

An exemplary structure of the pilot operated regulator 22, according to an aspect of the disclosed subject matter, is illustrated in FIG. 3. The pilot operated regulator 22 includes a valve body 200 which can be incorporated into a system in need of fluid pressure control, such as the tire inflation system 20. The valve body 200 includes a regulator section 202 having a closed end and an open end portion. A cap section 204 is attached to the open end portion of the regulator section 202 by suitable means, such as a threaded connection. A pilot section 206 is attached to the cap section 204 by suitable means, such as a threaded connection. The regulator section 202, cap section 204, and pilot section 206 preferably have cylindrical inner surface portions defining respective cavities that are arranged coaxially. It is contemplated that the cap section 204 and pilot section 206 could be formed as a single component.

The regulator section 202 includes a fluid inlet port 220 into which inlet pressure PI is directed from a source of fluid pressure. The regulator section 202 also includes a fluid outlet port 222 from which outlet pressure PO may flow. A poppet valve arrangement 224 is supported in the regulator section 202 and selectively allows or blocks fluid communication between the fluid inlet port 220 and the fluid outlet port 222. Movement of the poppet valve arrangement 224 from a seat 226 allows fluid communication between the fluid inlet port 220 and the fluid outlet port 222. A spring 228 biases the poppet valve arrangement 224 to a closed condition blocking fluid communication between the fluid inlet port 220 and the fluid outlet port 222. The force applied by spring 228 is relatively low and sufficient to hold the supply or poppet valve against the seat 226 when the pilot operated regulator 22 is in a closed condition.

The cap section 204 houses a spacer 240 located between a regulator diaphragm 242 and an upper or pilot diaphragm 244. The regulator diaphragm 242 controls the position and condition of the poppet valve arrangement 224. A regulator spring 248 is located between the regulator section 202 and the regulator diaphragm 242. The regulator spring 248 biases the regulator diaphragm 242 in a direction which would apply a force to move the poppet valve arrangement 224 in a direction toward the closed position. The force that the regulator spring 248 applies to the regulator diaphragm 242 is relatively greater than the force applied by the spring 228. The force of the regulator spring 248 must be overcome by the opposing forces acting on the regulator diaphragm 242 to move the poppet valve arrangement 224 away from the seat 226 and allow fluid communication between the fluid inlet port 220 and the fluid outlet port 222.

The cap section 204 has exhaust ports 260 communicating with atmosphere. The exhaust ports 260 are also partially defined by a space between the cap section 204 and the pilot section 206. The poppet valve arrangement 224 has a supply portion 262 which selectively allows or blocks fluid communication between the fluid inlet port 220 and fluid outlet port 222. The poppet valve arrangement 224 also has an exhaust portion 264 that selectively allows or blocks fluid communication between the fluid outlet port 222 and the exhaust ports 260. The exhaust portion 264 includes a hollow spindle or stem portion 266 of the poppet valve arrangement 224 through which fluid may flow.

The pilot section 206 includes a port 280 through which the pilot pressure PP enters the pilot section. The pilot section 206 also houses a movable sealed piston 282 located in an upper portion of the cavity defined by the pilot section. A spring 284 is located between the piston 282 and the upper or pilot diaphragm 244. The piston 282 has enough upward travel within the pilot section 206 so that the spring 284 can go into a free state where no force is applied to the pilot diaphragm 244 or piston 282. The spring 284 applies a force directly to the pilot diaphragm 244 to move the poppet valve arrangement 224 to the open position. Fluid flow into the pilot section 206, due to pilot pressure PP, exerts a force on the piston 282 attempting to move the piston upwardly. Fluid flow into the pilot section 206, due to pilot pressure PP, also exerts a force against the pilot diaphragm 244, which transfers the force to the spacer 240 and ultimately to the regulator diaphragm 242. The pilot section 206 also includes a shoulder 286 for the piston 282 to engage and limit upward, as viewed in FIG. 3, movement of the piston. It should be apparent that other types of piston travel limiting structure may be employed.

An adjustment cap 300 is threaded onto an upper portion of the pilot section 206. Upon rotation of the adjustment cap 300, a force is applied by a spring 302 against the piston 282 and attempts to move the piston downwardly. The position established by the piston 282 establishes the minimum threshold pressure allowed by the pilot operated regulator 22 regardless of the pilot pressure PP. The minimum threshold pressure may typically be set in the range of from about 62 psi to about 85 psi, and by way of example, preferably at about 70 psi for tires typically used on heavy-duty trailer applications. This minimum threshold pressure is the pressure that the pilot operated regulator 22 strives to always deliver as the outlet pressure PO without regard to pilot pressure PP.

An offset adjustment member 320 is threaded into the adjustment cap 300. Rotation of the offset adjustment member 320 engages the top of the piston 282 to set the position of the piston and establish an offset pressure delivered as the outlet pressure PO that will vary from the pilot pressure PP. The offset pressure typically may be up to +/- about 25 psi from pilot pressure PP. The exact offset pressure will depend upon the application and situation in which the pilot operated regulator 22 is used.

Figure 4:
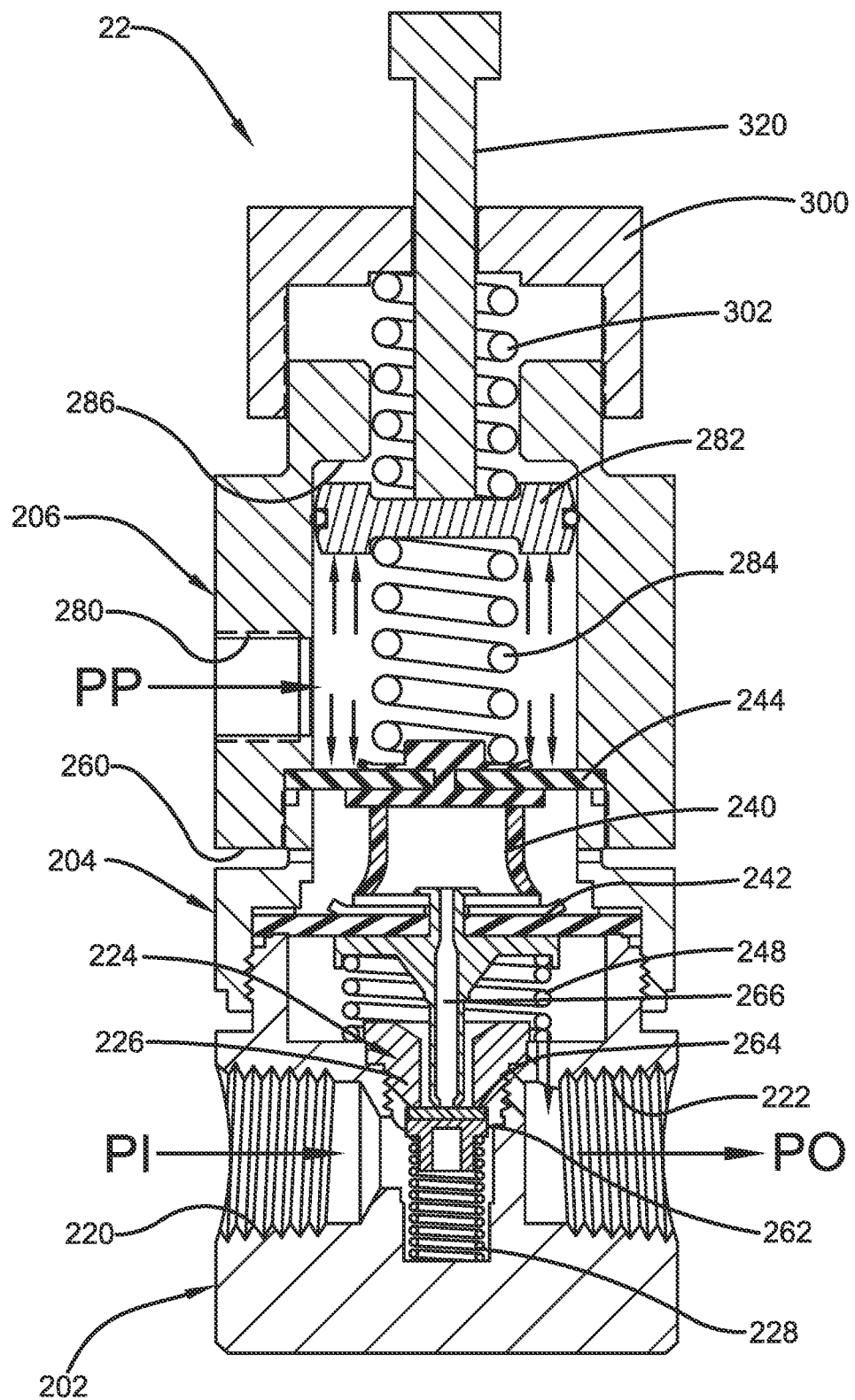
FIGS. 4-10 are cross-sectional elevational views of the pilot operated regulator, similar to FIG. 3, in various exemplary operating conditions.

Various operating conditions of the pilot operated regulator 22 are illustrated in FIGS. 4-10. FIG. 4 illustrates the pilot operated regulator 22 in a balanced state or condition. That is, the supply portion 262 and exhaust portion 264 of the poppet valve arrangement 224 are both closed. There is no fluid flow from the fluid inlet port 220 to the fluid outlet port 222 or the exhaust ports 260. This represents a condition where the demand for fluid flow and a pressure adjustment from the fluid outlet port 222 is not needed, for example when a downstream component such as the tire and wheel assembly 40 is at or slightly above the proper or desired minimum threshold pressure for a given pilot pressure or load. The pilot pressure PP acts on the piston 282 and the pilot diaphragm 244 in an attempt to move the piston and pilot diaphragm in opposite directions. The piston 282 is shown in FIG. 4 positioned against the offset adjustment member 320. This indicates that the pilot pressure PP is high enough to cancel the force from spring 302 that would transfer through piston 282 to spring 284. In other words, the pilot pressure PP generates an outlet pressure PO that is above the minimum threshold. The forces generated by the pilot pressure PP, the outlet pressure PO, spring 284, and regulator spring 248 all balance at a position of the regulator diaphragm 242 where supply portion 262 and the exhaust portion 264 of the poppet valve arrangement 224 are both closed. In this state, the outlet pressures PO and devices, such as the tire and wheel assembly 40, connected to the outlet port 222 are at the optimal or desired minimum threshold pressure level for the given pilot pressure PP and no additional fluid pressure is delivered.

An example of the pilot operated regulator 22 being in the balanced state or condition would be if the upper spring 302 exerts a force on the piston 282 equivalent to 70 psi as a minimum threshold pressure setting. The lower spring 284 could be selected to exert a force on the piston 282 equivalent to 70 psi. The piston 282 and pilot diaphragm 244 could have equal surface areas upon which pilot pressure PP acts. If there is no pilot pressure PP and the outlet pressure PO is 70 psi, the regulator diaphragm 242 is in a position where supply portion 262 and the exhaust portion 264 of the poppet valve arrangement 224 are both closed so there is no additional pressure or fluid flow delivered to the tire and wheel assembly 40. The tire and wheel assembly 40 would maintain the minimum threshold pressure setting, such as 70 psi.

Figure 5:
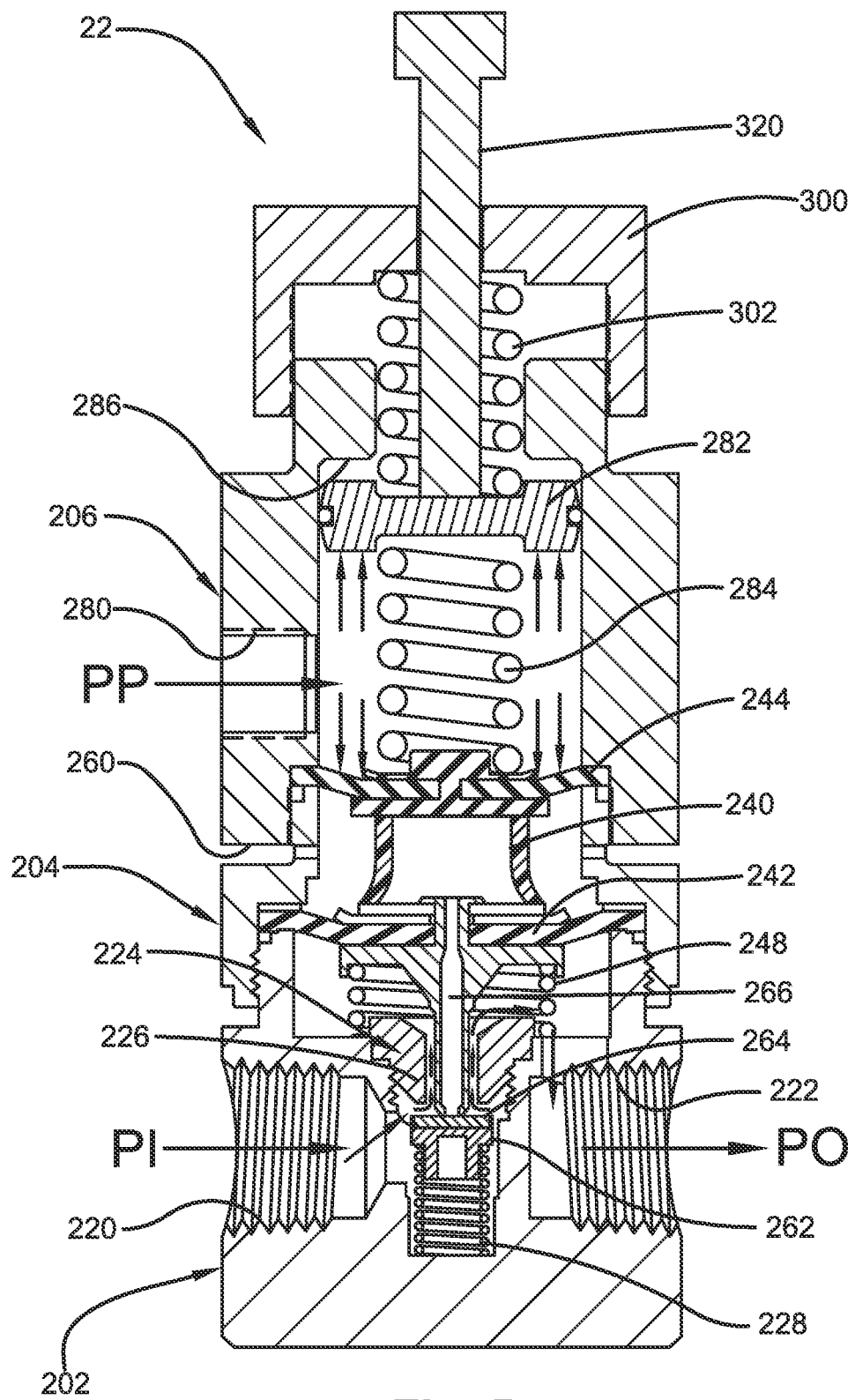

FIG. 5 illustrates the pilot operated regulator 22 in a fill or supply state or condition. If the pilot operated regulator 22 is used in the tire inflation system 20 (FIGS. 1-2), fluid flow would inflate tires 40. The supply portion 262 of the poppet valve arrangement 224 is open and the exhaust portion 264 is closed. In this condition, the demand or outlet pressure PO is less than desired for a given pilot pressure PP. The regulator diaphragm 242 is bowed downward, as viewed in FIG. 5, from the force of the pilot pressure PP acting on the pilot diaphragm 244 through the spacer 240. The regulator diaphragm 242 exerts a force to the poppet valve arrangement to unseat the supply portion 262 of the poppet valve arrangement 224 to allow fluid flow from the fluid inlet port 220 to the fluid outlet port 222. The fluid flow in the regulator section 202 is represented by small arrows indicating the direction of flow through the regulator section 202 around the stem portion 266. The supply portion 262 of the poppet valve arrangement 224 will remain in this relative position until outlet pressure PO balances the forces from spring 284 and the pilot pressure PP. At that time, the regulator diaphragm 242 returns to its non-bowed or balanced state position, such as that illustrated in FIG. 4, and the poppet valve arrangement 224 returns to the closed position blocking fluid flow from the fluid inlet port 220 to the fluid outlet port 222.

An example of the pilot operated regulator 22 being in a fill or supply state or condition would be if the upper spring 302 and the lower spring 284 exert the same force on the piston 282. The piston 282 and pilot diaphragm 244 have equal surface areas upon which pilot pressure PP acts. If the pilot pressure PP is greater than zero, the regulator diaphragm 242 is in a position where the supply portion 262 of the poppet valve arrangement 224 is open and there is additional pressure or fluid flow delivered to the tire and wheel assembly 40 that is proportional to the pilot pressure. The pressure in tire and wheel assembly 40 would be maintained at or above the minimum threshold pressure. It is contemplated that different spring rates could be selected for the upper spring 302 and the lower spring 284 in order to vary outlet pressure PO.

Figure 6:
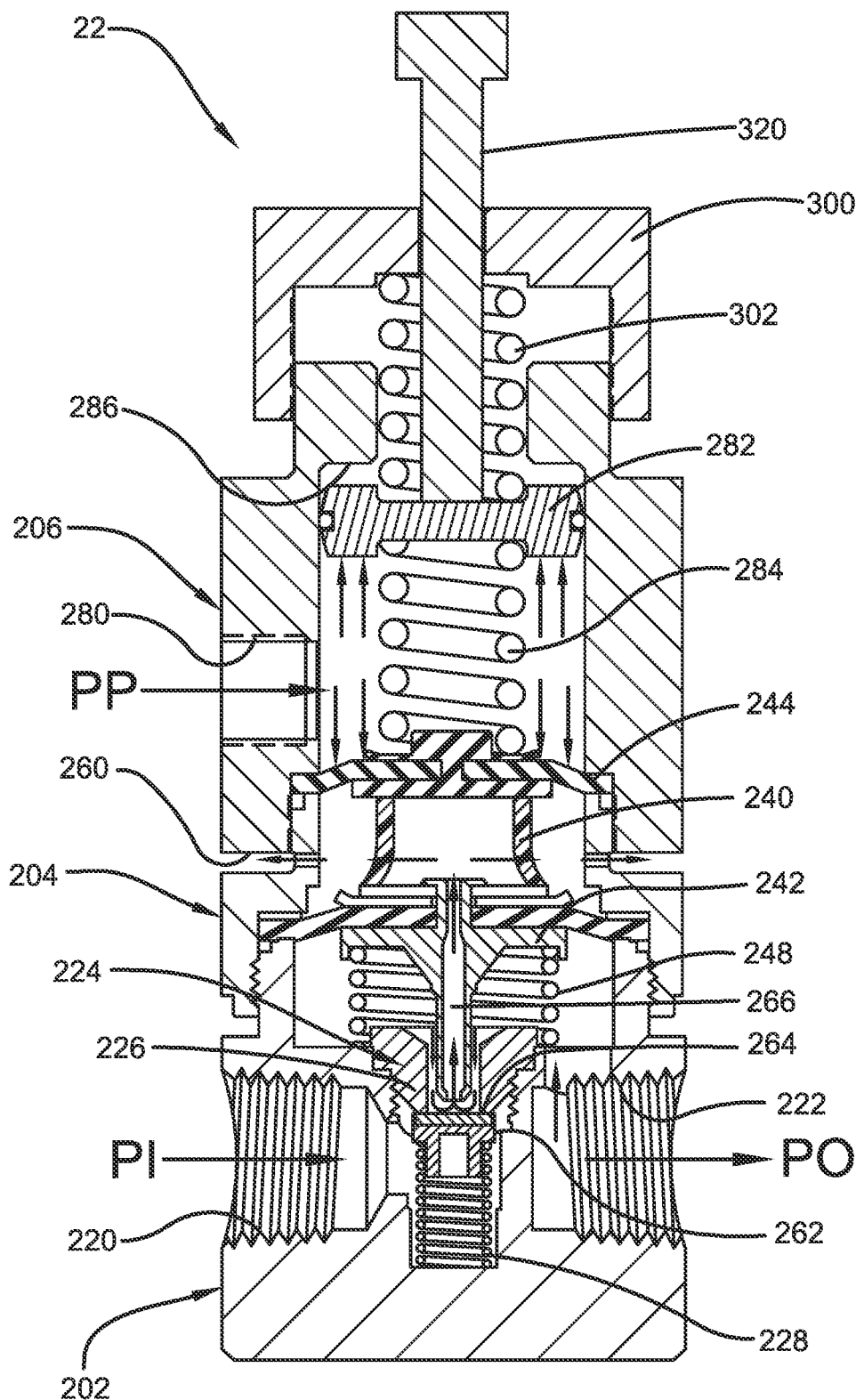

FIG. 6 illustrates the pilot operated regulator 22 in an exhaust state or condition. If the pilot operated regulator 22 is used in the tire inflation system 20, fluid flow would deflate the tires of the tire and wheel assemblies 40. The supply portion 262 of the poppet valve arrangement 224 is closed and the exhaust portion 264 is open. In this condition, the demand or outlet pressure PO overcomes the pilot pressure PP. The regulator diaphragm 242 is bowed upwardly, as viewed in FIG. 6. The regulator diaphragm 242 allows the supply portion 262 to seat the poppet valve arrangement 224. The fluid flow in the regulator section 202 and cap section 204 is represented by small arrows indicating the direction of flow through the hollow stem portion 266 of the poppet valve arrangement 224. The exhaust portion 264 of the poppet valve arrangement 224 will remain in this relative position until outlet pressure PO balances the forces from spring 284 and the pilot pressure PP. At that time the regulator diaphragm 242 returns to its balanced state position, as illustrated in FIG. 4, and the exhaust portion 264 of the poppet valve arrangement 224 returns to the closed state blocking fluid flow from the outlet port 222 to the exhaust ports 260. Note that in the positions illustrated in FIGS. 4-6 of the pilot operated regulator 22, the piston 282 has not moved from its position against offset adjustment member 320. This indicates that the pilot pressure PP is high enough to cancel the force from spring 302 that would transfer through piston 282 to spring 284. In other words, the pilot pressure PP generates an outlet pressure PO that is above the minimum threshold.

Figure 7:
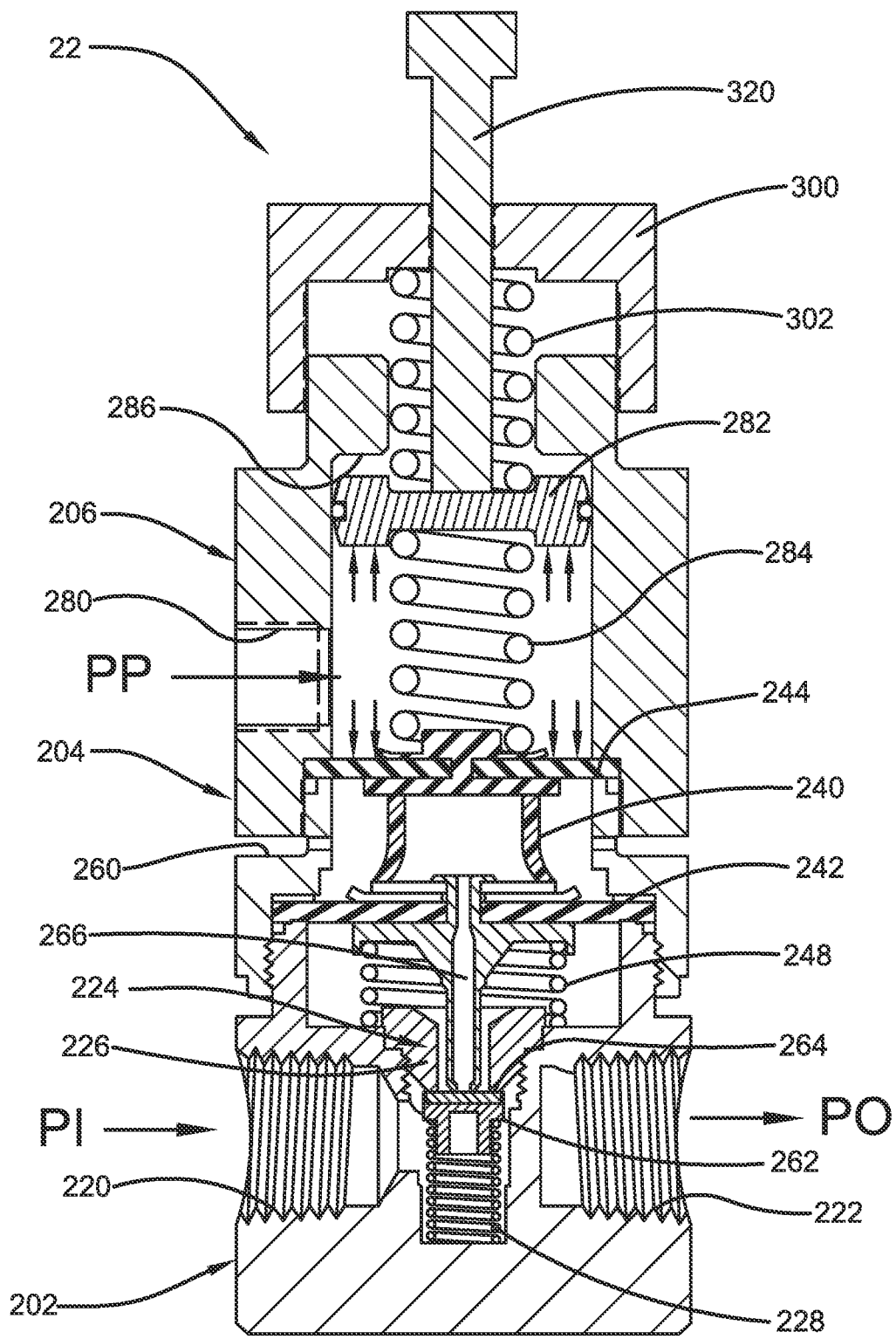

FIG. 7 illustrates the pilot operated regulator 22 in a condition where pilot pressure PP corresponds to the outlet pressure PO at a set minimum threshold pressure or above. The adjustment cap 300 is turned to adjust and set the minimum output pressure PO of the pilot operated regulator 22 to a desired pressure value, such as 70 psi. The adjustment cap 300 compresses the spring 302 to apply a force to an upper surface of the piston 282. Pilot pressure PP acts on the lower surface of the piston 282 and opposes the force of the spring 302. If pilot pressure PP is greater than the force applied to the piston 282 by the spring 302, the piston 282 rests against the shoulder 286 of the pilot section 206 or the offset adjustment member 320. In this position the pilot pressure PP is great enough to generate an outlet pressure PO that is equal to or greater than the minimum threshold pressure that was set.

Figure 8:
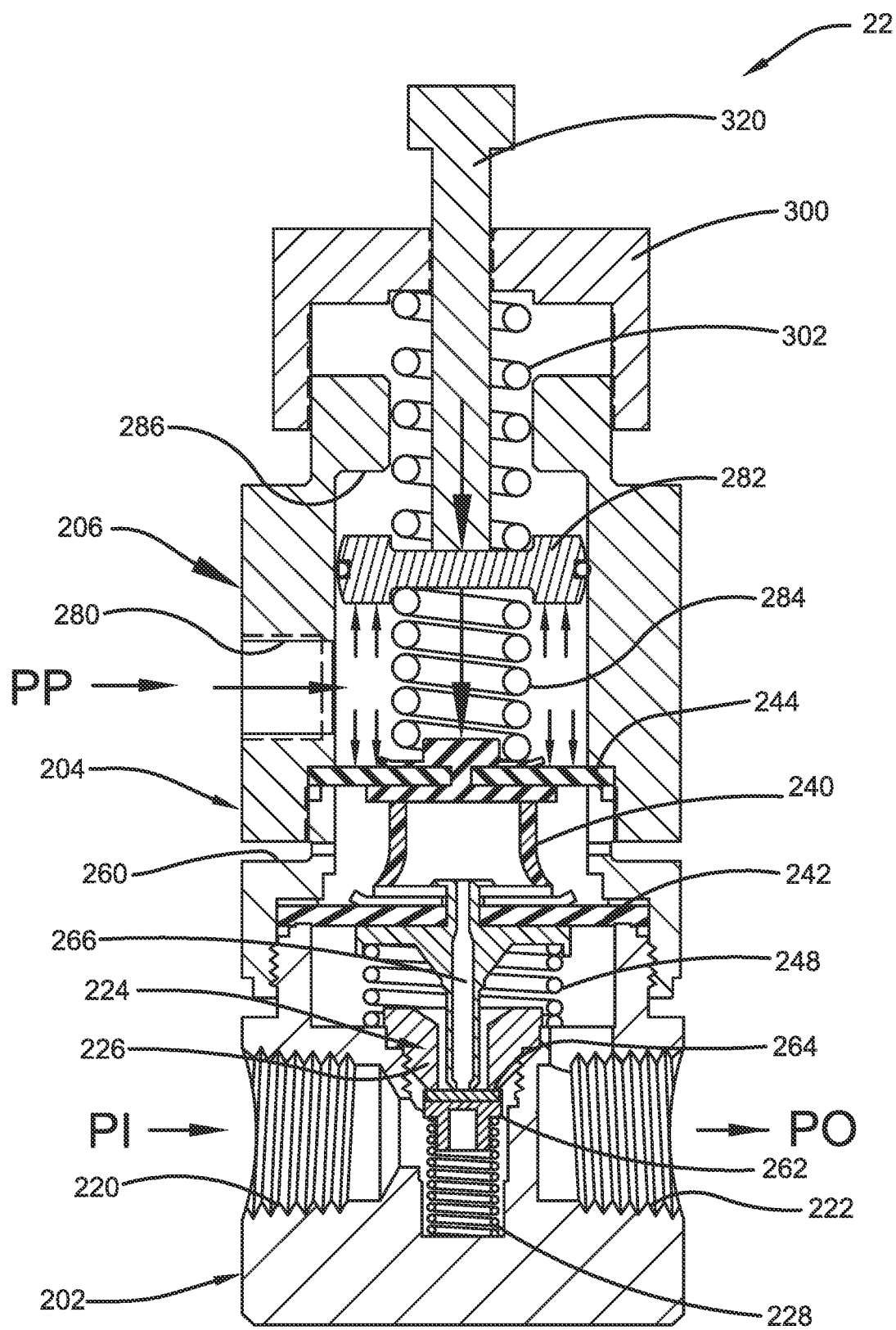

FIG. 8 illustrates the pilot operated regulator 22 in a condition where pilot pressure PP is less than the force applied by the spring 302. The piston 282 moves downwardly away from the shoulder 286 of the pilot section 206. The piston 282 compresses the spring 284 which applies a force to the pilot diaphragm 244. The pilot diaphragm 244 applies a force to the spacer 240 which is transmitted to the regulator diaphragm 242. This opens the supply portion 262 of the poppet valve arrangement 224 and allows fluid flow to the fluid outlet port 222 and maintains the outlet pressure PO to at least the minimum threshold pressure. The force transferred through the spring 284 is the force set by the position of the adjustment cap 300 minus the force that is generated against the piston 282 by the pilot pressure PP. When the pilot pressure PP is above a minimum threshold pressure, the force from the spring 284 seats the piston 282 against the shoulder 286 of the pilot section 206 or the offset adjustment member 320 and cancels the force of the spring 302. It is also possible to vary the force exerted by spring 302 by changing the effective area of the piston 282, if the application requires the minimum outlet pressure PO to vary over the range of pilot pressures PP. It should be noted that the piston 282 could also be replaced by a diaphragm.

When pilot pressure PP is at or above the corresponding minimum threshold pressure, the pilot pressure drives the piston 282 upwardly and cancels the force from the spring 284. The force acting on the pilot diaphragm 244 is from pilot pressure PP and the force established by the offset adjustment member 320, if offset has been adjusted higher. When pilot pressure PP drops below the corresponding established minimum threshold pressure, the force of spring 302 is greater than the force applied by the pilot pressure acting on the piston 282. Therefore, not all of the force of the spring 302 is canceled. This causes the piston 282 to move downwardly and compress the spring 284, causing the pilot diaphragm 244 to apply a force to the regulator diaphragm 242 through spacer 240 and open the poppet valve arrangement 224.

Figure 9:
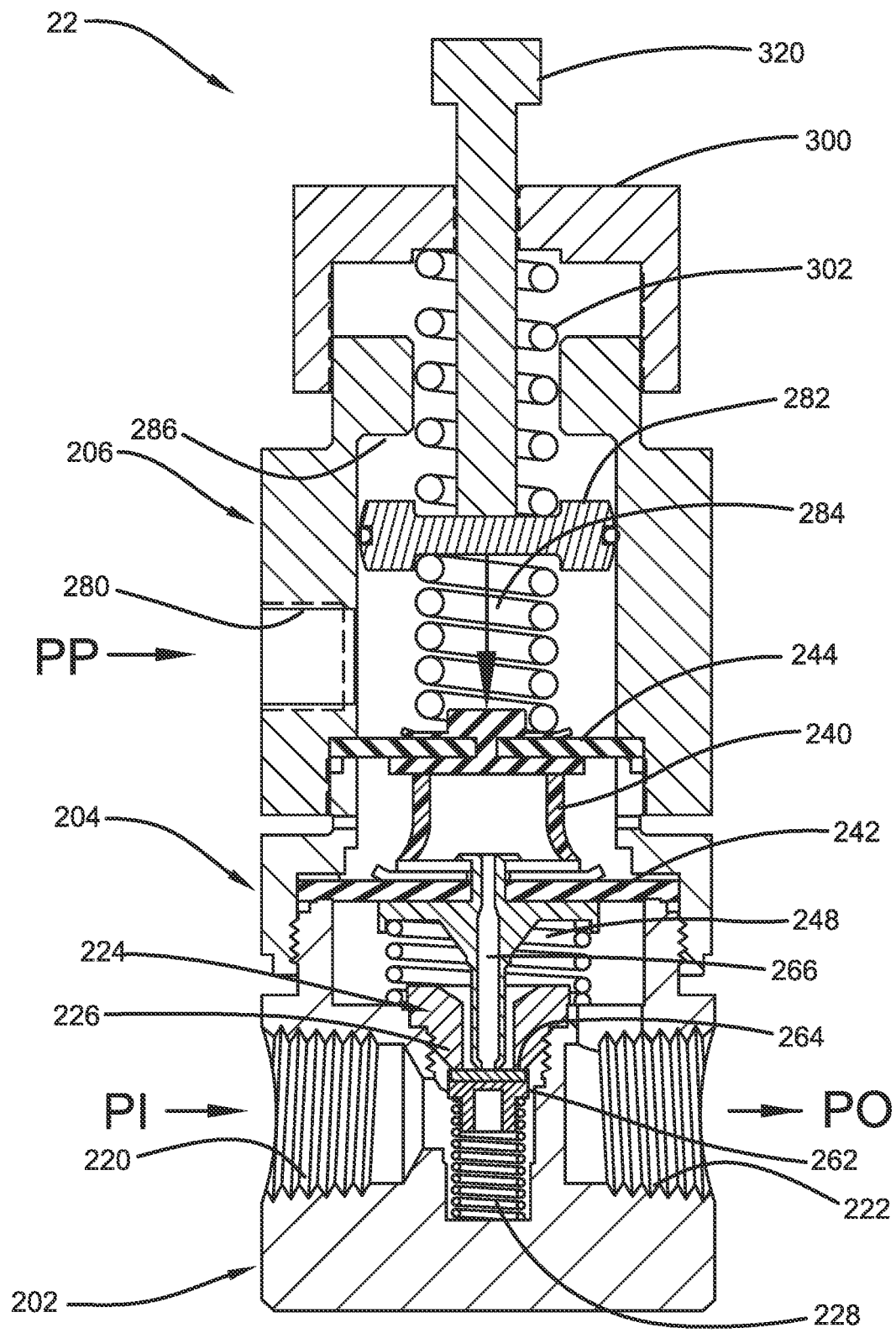

There are occasions where it is desirable to adjust outlet pressure PO higher or lower than the pilot pressure PP by a fixed amount. The offset adjustment member 320 is used to adjust the offset of the outlet pressure PO relative to pilot pressure PP. The offset adjustment member 320 enables this desired condition and is illustrated in FIGS. 9-10.

To increase the outlet pressure PO relative to the pilot pressure PP, the offset adjustment member 320 is turned to move the piston 282 downwardly. When the offset adjustment member 320 is adjusted to set the position of the piston 282 away from the shoulder 286, the force applied by the spring 284 to the pilot diaphragm 244 is increased. When the offset adjustment member 320 is turned to move the piston 282 downwardly to the position illustrated in FIG. 9, the spring 284 compresses to increase the force transmitted to the regulator diaphragm 242 and increase the outlet pressure PO relative to the pilot pressure PP by a fixed amount. The force of the compressed spring 284 is in addition to the force created by the pilot pressure PP and is independent of the pilot pressure. In other words, the pilot pressure PP does not cancel or affect the force generated by the offset adjustment member 320.

Figure 10:
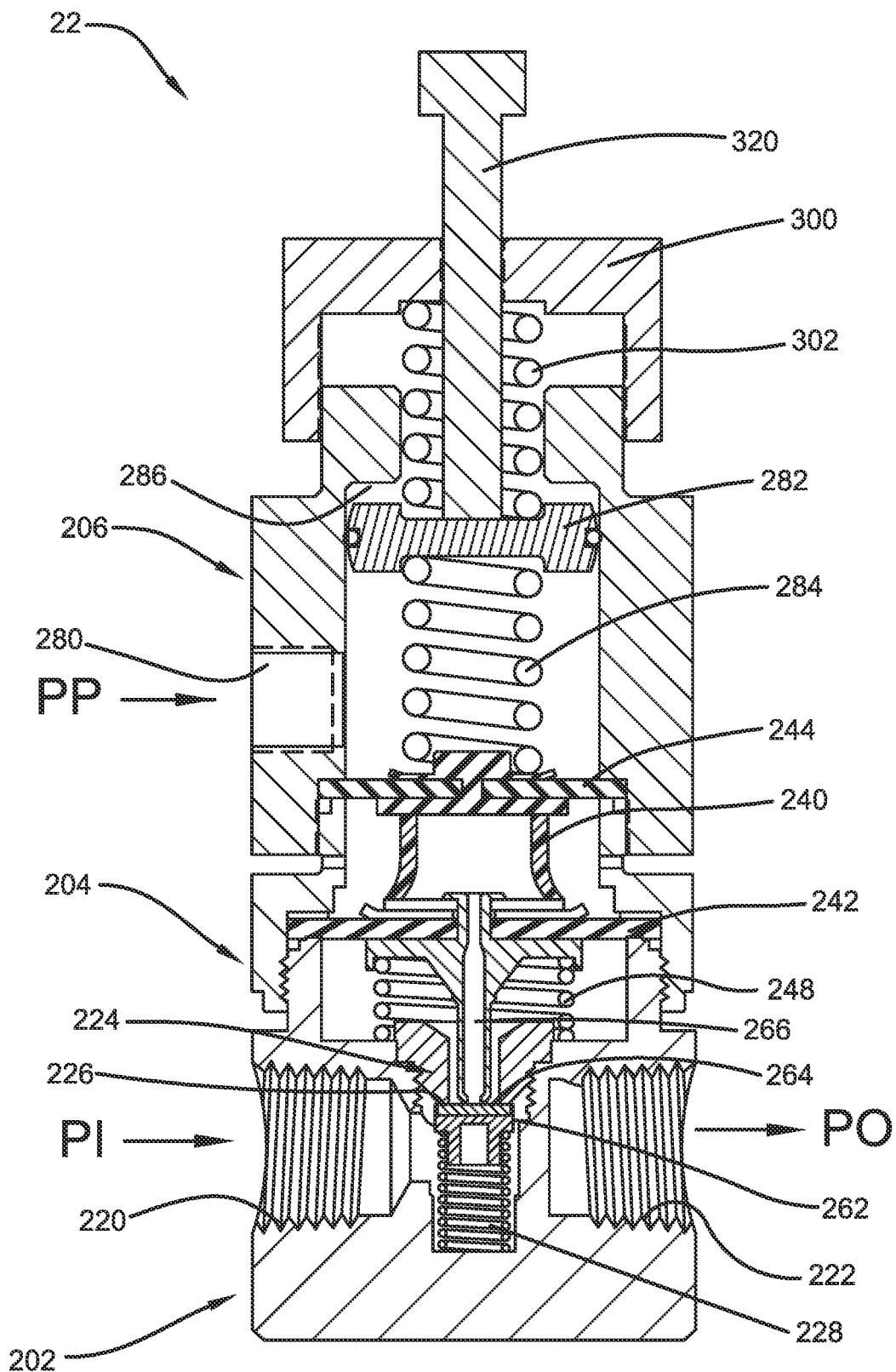

To reduce outlet pressure PO below the pilot pressure PP, the offset adjustment member 320 is turned to allow the piston 282 to move upwardly in a direction toward the shoulder 286 as illustrated in FIG. 10. The offset adjustment member 320 is in a position allowing the piston 282 to move upwardly but still spaced from the shoulder 286 to relax the spring 284. The position of the piston 282 relieves any force imparted by the spring 284, assuming that adjustment cap 300 is also turned out so that spring 302 is not compressed. The force of the spring 284 transmitted to the regulator diaphragm 242 is reduced or eliminated which does not provide any offset outlet pressure PO relative to pilot pressure PP. When there is no pilot pressure PP, outlet pressure PO is then established by the spring 302. The relationship between pilot pressure PP and outlet pressure PO may be established by having a regulator diaphragm with a different effective area than that of the pilot diaphragm. It is also contemplated that the piston 282 could have a larger effective area than that of the pilot diaphragm 244 by about 9.6%.

It should be noted that for applications where outlet pressure PO must be lower than the pilot pressure PP, the pilot diaphragm 244 can be constructed so that it has a smaller effective area than the regulator diaphragm 242. In the illustrated aspect of the pilot operated regulator 22, the pilot diaphragm 244 has a smaller diameter than the regulator diaphragm 242. It is contemplated that the effective areas of the pilot diaphragm 244 and the regulator diaphragm 242 are the same. Also, a regulator spring 248 can be added in the regulator section 202 to oppose the force of the pilot pressure PP.

There are several advantages of the disclosed subject matter over the prior art. For example, in order to provide pilot operated regulator functionality, adjustable minimum threshold pressure, and offset pressure relative to pilot pressure, prior art systems would employ a second regulator and a valve to direct flow from one regulator to the other. Another potential approach is to use an electronically controlled regulator with various sensors and a control algorithm. These systems are expensive and require a reliable source of electrical power, something that is not always available on a heavy-duty vehicle, such as a trailer detached from a tractor. The disclosed subject matter provides the same functionality in a single pilot operated regulator 22 and does not require electrical power. That is, the pilot operated regulator 22 of the disclosed subject matter provides control functions and additional features in a single integrated package. This reduces the size of the regulator valve body and the complexity of the system which improves reliability and reduces costs. The pilot operated regulator 22 may be used in any type of tire inflation system. In addition to use in tire inflation systems, the pilot operated regulator 22 may be used in industrial process or machinery control.

The disclosed subject matter successfully incorporates a pilot operated regulator in a load-based tire inflation system that is capable of automatically and continuously adjusting fluid pressure in vehicle tires in response to pilot pressure communicated from an air spring, having an adjustable minimum outlet pressure, and having adjustable offset pressure relative to pilot pressure. The tire inflation system with the pilot operated regulator of the disclosed subject matter may improve performance characteristics and properties of tire and wheel assemblies, increase fuel economy, decrease heavy-duty vehicle downtime and operational cost, and improve tire life and the durability that is required in the transportation industry. It is to be understood that the disclosed subject matter finds application with all types of tire inflation systems, air springs and suspension systems without affecting the concept or implementation of the disclosed subject matter. Accordingly, the improved load-based tire inflation system is relatively simple, provides an effective and efficient structure which overcome limitations, disadvantages and drawbacks of the prior art.

It is to be understood that the structure and operation of the improved pilot operated regulator 22 of the disclosed subject matter may be altered or rearranged, or certain components omitted or added, without affecting the overall concept or operation. For example, rather than have features to adjust the offset pressure and the minimum threshold pressure, springs can be placed in positions that provide a fixed offset and minimum threshold without the capacity for adjustment. This might be useful in applications where offset and minimum threshold pressures never need to change. The improved pilot operated regulator may also be employed in industrial machinery, factory equipment or automation applications where it is desirable to maintain operating pressure at or above a minimum threshold pressure. The improved pilot operated regulator 22 may replace several components, such as valves and conduits, previously needed to perform the same function as the single improved pilot operated regulator of the disclosed subject matter.

While reference is made generally to a heavy-duty vehicle for the purpose of convenience, it has been with the understanding that such reference includes trucks, tractor-trailers or semi-trailers, and trailers thereof. The concepts of the pilot operated regulator 22 are described with reference to at least one specific aspect. It is understood that this description and illustration is by way of example and not by way of limitation.

In the foregoing description, certain terms have been used for brevity, clarity and understanding, but no unnecessary limitations are to be implied therefrom beyond the requirements of the prior art, because such terms are used for descriptive purposes and are intended to be broadly construed. Possible modifications and alterations may occur to others upon a reading and understanding the disclosed subject matter, and it is understood that the disclosed subject matter includes all such modifications, alterations and equivalents.

Having now described the features, discoveries and principles of the disclosed subject matter, the manner in which the load-based tire inflation system is used and installed, the characteristics of the construction, arrangement and method steps, and the advantageous, new and useful results obtained; the new and useful structures, devices, elements, arrangements, process, parts and combinations are set forth.

What is claimed is:

1. A regulator for establishing outlet fluid pressure, the regulator comprising:
    a valve body having a fluid pressure inlet in selective fluid communication with a fluid pressure outlet;
    a pilot pressure inlet formed in the valve body and in fluid communication with a source of pilot pressure;
    valving structure within the valve body for establishing outlet fluid pressure as a function of pilot pressure;
    first adjustable structure within the valve body to establish a minimum outlet fluid pressure threshold without regard to pilot pressure; and
    second adjustable structure within said valve body, said second adjustable structure including a piston, a first diaphragm separated by a resilient structure to define a pilot chamber in fluid communication with said source of pilot pressure, and a second diaphragm spaced from and connected with said first diaphragm to locate said second diaphragm to affect the condition of the valving structure,
    wherein a force applied by said resilient structure establishes outlet fluid pressure offset relative to pilot pressure.

2. The regulator of claim 1 wherein the first adjustable structure is coaxially arranged with the adjustable second adjustable structure.

3. The regulator of claim 1 wherein the second adjustable structure is coaxially arranged with a direction of movement of the valving structure.

4. The regulator of claim 1 further including a resilient mechanism acting on the piston to position the first diaphragm for establishing the minimum outlet fluid pressure threshold without regard to pilot pressure.

5. The regulator of claim 1 wherein the first adjustable structure is coaxially arranged with a direction of movement of the valving structure.

6. The regulator of claim 1 used in a load-based tire inflation system for a heavy-duty vehicle, the heavy-duty vehicle having an air spring suspension system in which fluid pressure in the air spring suspension system varies with a weight of the heavy-duty vehicle and wherein the source of pilot pressure is fluid pressure from the air spring suspension system.

7. The regulator of claim 1 wherein the valving structure comprises a poppet valve arrangement.

8. A load-based tire inflation system comprising:
    an air spring generating a pilot pressure as a function of a weight of a heavy-duty vehicle;
    a regulator having a fluid pressure inlet in selective fluid communication with a fluid pressure outlet;
    a pilot pressure inlet formed in the regulator and in fluid communication with the air spring to communicate the pilot pressure to the regulator;
    valving structure within the regulator for establishing outlet fluid pressure as a function of the pilot pressure; and
    first adjustable structure within the regulator to establish a minimum outlet fluid pressure threshold without regard to pilot pressure.

9. The regulator of claim 8 further including second adjustable structure within the regulator to establish outlet fluid pressure offset relative to pilot pressure.

10. The regulator of claim 9 wherein the first adjustable structure is coaxially arranged with the adjustable second adjustable structure.

11. The regulator of claim 9 wherein the second adjustable structure is coaxially arranged with a direction of movement of the valving structure.

12. The regulator of claim 9 wherein the second adjustable structure further includes a piston and a first diaphragm separated by resilient structure to define a pilot chamber in fluid communication with the source of pilot pressure, the force applied by the resilient structure establishes outlet fluid pressure offset relative to pilot pressure.

13. The regulator of claim 12 further including a resilient mechanism acting on the piston to position the first diaphragm for establishing the minimum outlet fluid pressure threshold without regard to pilot pressure.

14. The regulator of claim 12 further including a second diaphragm spaced from and connected with the first diaphragm to locate the second diaphragm to affect the condition of the valving structure.

15. The regulator of claim 8 wherein the first adjustable structure is coaxially arranged with a direction of movement of the valving structure.

16. The regulator of claim 8 wherein the valving structure comprises a poppet valve arrangement.

17. A load-based tire inflation system comprising:
    a source of fluid pressure;
    a tire and wheel assembly operatively mounted to a heavy-duty vehicle and being in selective fluid communication with the source of fluid pressure;
    an air spring suspension system having a fluid pressure that is a function of a weight of the heavy-duty vehicle;
    a regulator in fluid communication with and located between the source of fluid pressure and the tire and wheel assembly, the regulator also being in fluid communication with the air spring suspension system, the regulator continuously controlling fluid pressure in the tire and wheel assembly; and
    adjustable structure within the regulator to establish a minimum fluid pressure delivered to the tire and wheel assembly, the regulator maintaining fluid pressure in the tire and wheel assembly at or above the minimum pressure threshold without regard to the fluid pressure in the air spring suspension system.

18. The load-based tire inflation system of claim 17 further including adjustable offset control within the regulator to vary fluid pressure delivered to the tire and wheel assembly by an amount relative to fluid pressure in the air spring suspension system.

19. A regulator for establishing outlet fluid pressure, the regulator comprising:
- a valve body having a fluid pressure inlet in selective fluid communication with a fluid pressure outlet;
- a pilot pressure inlet formed in the valve body and in fluid communication with a source of pilot pressure;
- valving structure within the valve body for establishing outlet fluid pressure as a function of pilot pressure; and
- first adjustable structure within the valve body to establish a minimum outlet fluid pressure threshold without regard to pilot pressure,
- wherein said regulator is used in a load-based tire inflation system for a heavy-duty vehicle, the heavy-duty vehicle having an air spring suspension system in which fluid pressure in the air spring suspension system varies with a weight of the heavy-duty vehicle and wherein the source of pilot pressure is fluid pressure from the air spring suspension system.

* * * * *